(12) United States Patent
Ryland

(10) Patent No.: US 7,308,444 B2
(45) Date of Patent: Dec. 11, 2007

(54) INFORMATION HANDLING MECHANISM

(75) Inventor: David Paul Austen Ryland, Cambridgeshire (GB)

(73) Assignee: Transversal Corporation Limited, Cambridge (GB)

( * ) Notice: Subject to any disclaimer, the term of this patent is extended or adjusted under 35 U.S.C. 154(b) by 0 days.

(21) Appl. No.: 11/281,842

(22) Filed: Nov. 17, 2005

(65) Prior Publication Data

US 2006/0106790 A1 May 18, 2006

(30) Foreign Application Priority Data

Nov. 17, 2004 (GB) ................................ 0425321.7

(51) Int. Cl.
*G06F 17/30* (2006.01)
*G06F 7/00* (2006.01)

(52) U.S. Cl. .......................................... 707/3; 707/100

(58) Field of Classification Search .................... 707/3, 707/4, 5, 100; 705/26, 27; 704/9
See application file for complete search history.

(56) References Cited

U.S. PATENT DOCUMENTS

| 5,418,948 | A | 5/1995 | Turtle |
| 5,488,725 | A | 1/1996 | Turtle et al. |
| 6,466,918 | B1 * | 10/2002 | Spiegel et al. ................. 705/27 |
| 6,598,039 | B1 | 7/2003 | Livowsky |
| 2005/0222987 | A1 * | 10/2005 | Vadon ............................ 707/3 |
| 2006/0041536 | A1 * | 2/2006 | Scholl et al. ................... 707/3 |
| 2006/0167757 | A1 * | 7/2006 | Holden et al. ................. 705/26 |

FOREIGN PATENT DOCUMENTS

| WO | WO 99/66427 | * 12/1999 |
| WO | WO02/21259 A1 | 3/2002 |

\* cited by examiner

*Primary Examiner*—Sam Rimell
(74) *Attorney, Agent, or Firm*—Martin Fleit; Paul D. Bianco; Fleit Kain Gibbons Gutman Bongini & Bianco P.L.

(57) ABSTRACT

Conventional electronic information retrieval systems using specialist databases assume that the database being searched is appropriate to the search being conducted.

The invention solves the problem that the above assumption may be incorrect. It does this by providing mechanisms (4, 4A and 4B) for identifying concepts respectively in: the search input question, a specialist database and a non-specialist database.

A comparator 8 and associated mechanisms are able to analyze how the specialist database differs from the non-specialist database and to use this information to derive an indication of the ability of the specialist database to answer the input question. This indication can be fed to the user via interface 1 or in an alternative arrangement could be used to block inappropriate information.

13 Claims, 5 Drawing Sheets

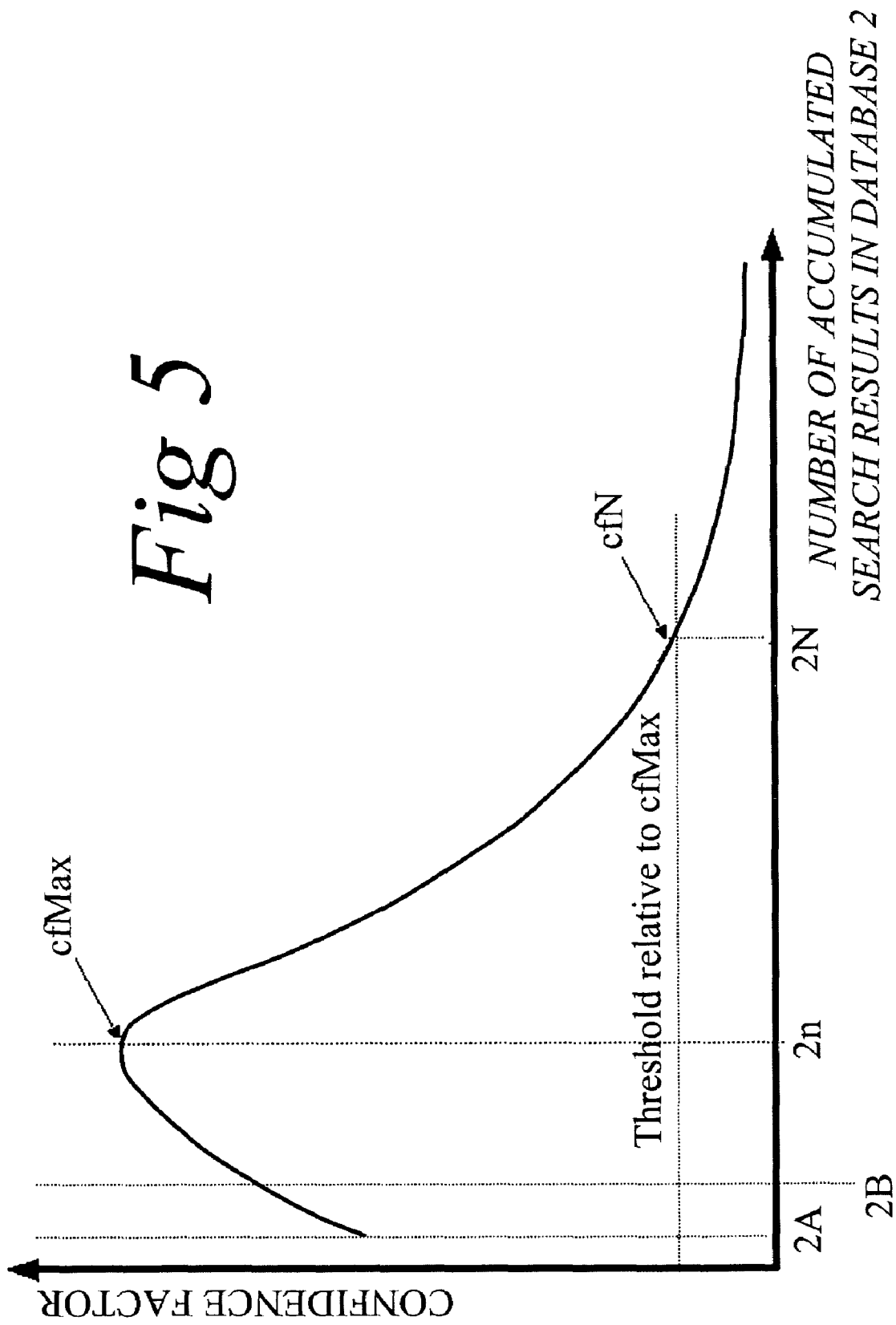

INFORMATION HANDLING MECHANISM

BACKGROUND TO THE INVENTION

This invention relates to an information handling mechanism.

Many existing information handling systems apply an input to a specialist database to give some meaningful output. In all cases it is assumed that the database has some relevance to the input, perhaps because a user or an automatic mechanism has specifically chosen that database.

For example patent specification U.S. Pat. No. 5,488,725A describes a document retrieval system where it is assumed that the information-source is appropriate for any search being made.

Patent specification U.S. Pat. No. 5,418,948A describes a method for pre-processing a natural language search-query to produce a different search-query which is more appropriate for use with a document retrieval system. This system assumes that the information-source is appropriate for the search.

Patent U.S. Pat. No. 6,598,039B1 describes a document retrieval system; it assumes that the information-source is appropriate for the search.

Patent WO02/21259A1 describes a system of integrating several data-sources and searching across them such that different parts of the search-query involve different data-sources. This system likewise assumes that the information-source is appropriate for the search.

All these known systems suffer from the problem that the assumption that the information source is appropriate for the search may be incorrect.

OBJECT OF THE INVENTION

This invention has for its object the improvement of searching procedures by recognizing the existence of the above problem and offering a solution to it.

SUMMARY OF THE INVENTION

This invention arose from a realisation that it would be potentially useful in many situations to derive, automatically, an indication of the relevance of a database to the input.

The invention makes it possible to determine if an information-source is applicable to a given information need. For example, if an information need is "What's the best tennis racket?" and the information-source we have is the collection of all patents related to Information Retrieval, then the invention would be able to suggest to the enquirer that he/she was trying to retrieve information from the wrong collection information source; it does this without retrieving a single patent from the collection.

The invention provides an information handling mechanism comprising
  a) means for receiving an input;
  b) a specialist database containing information relevant to a specialist subject;
  c) means for generating concept models indicating occurrences of concepts in the specialist database and in a less specialist database;
  d) means for identifying concepts in the input; and
  e) means for calculating the relative probability that the identified concepts could have been generated by each concept model.

The less specialist database permits the system to "see" the specialist database as a subset of a larger area of knowledge and therefore to obtain a useful indication of the ability of the specialist database to provide a reliable output in response to the input. Expressed another way, the "less specialist database" allows the system to know what the specialist database does not know and thus to derive an indication of the usefulness of the specialist database in relation to input data.

The means for receiving the input could be an interactive user interface or a data port connected to receive information eg from the internet.

The "specialist database" will normally be a computer hard drive (or a part of it) on which a collection of documents is stored. These documents might consist of answers to frequently asked questions about a specialist subject such as a particular product or service.

The "less specialist database" will also normally be a computer hard drive (possibly more than one) on which is stored information selected because of its random nature. A suitable way of compiling this information has been found to be to use material from Usenet. This less specialist database needs to be many times larger than the specialist database: at least 10 times greater and preferably 100 times greater or more. It should preferably be big enough so that it contains at least some information related to the specialist database.

The "concept model" preferably includes a record of the frequency of occurrences of concepts in the databases. It could also indicate the frequency of sequences of concepts or otherwise be designed to produce some statistical analysis of concepts in the databases.

In this specification the word "concept" is defined as being a word or sequence of words with a defined meaning; or, where appropriate, a group of memory elements in which such a word or group of words is stored. The means for identifying these concepts could be a look-up table containing the concept definitions. For example, if each word were considered to be a distinct concept, the concept might simply be text as entered at the input. In the case of a voice input, the concept could be a voice pattern, phonynym or similar tokenisation of the voice input.

The "means for calculating" can be embodied in many different ways. For example, the relative probability can be calculated by measuring the ratio of the entropies of the sequence of identified concepts taken with respect to each of the concept models. An alternative would be to compare the sum of the probabilities of each of the identified comments with each concept model.

The result of calculation of relative probabilities can be used to perform a number of different functions. One possibility is to generate an indication to the user of confidence in the ability of the specialist database to answer a question entered at the input. This could be manifested as an image, a text message or a sound. Alternatively, the confidence information could be used to redirect the input to another information handling mechanism. For example, if the input were an e-mail, it may be useful to use the confidence information to route the email to an automated retrieval system or a terminal controlled by a human operator.

The invention can be used to block or reroute e-mails inappropriate to a recipient. In this situation the specialist database contains information appropriate to a recipient and the confidence measure is used either to block inappropriate e-mails or to route them to other mechanisms or people who can more competently deal with them.

A system employing the invention can use a specialist database having divisions relating to different specialist subjects or to different levels of specialisation within a given subject. The confidence measure is then used to control a mechanism for switching the input so that it is applied to a selected specialist division.

The invention can also be used as a device for restricting the number of results or "hits" retrieved by any information retrieval engine. It can also be used for the purpose of directing advertising or other material to selected websites having a relevance to that material.

BRIEF DESCRIPTION OF THE DRAWINGS

FIG. 5 is a schematic graph for assistance in understanding the operation of the embodiment of FIG. 4.

Figure 1:
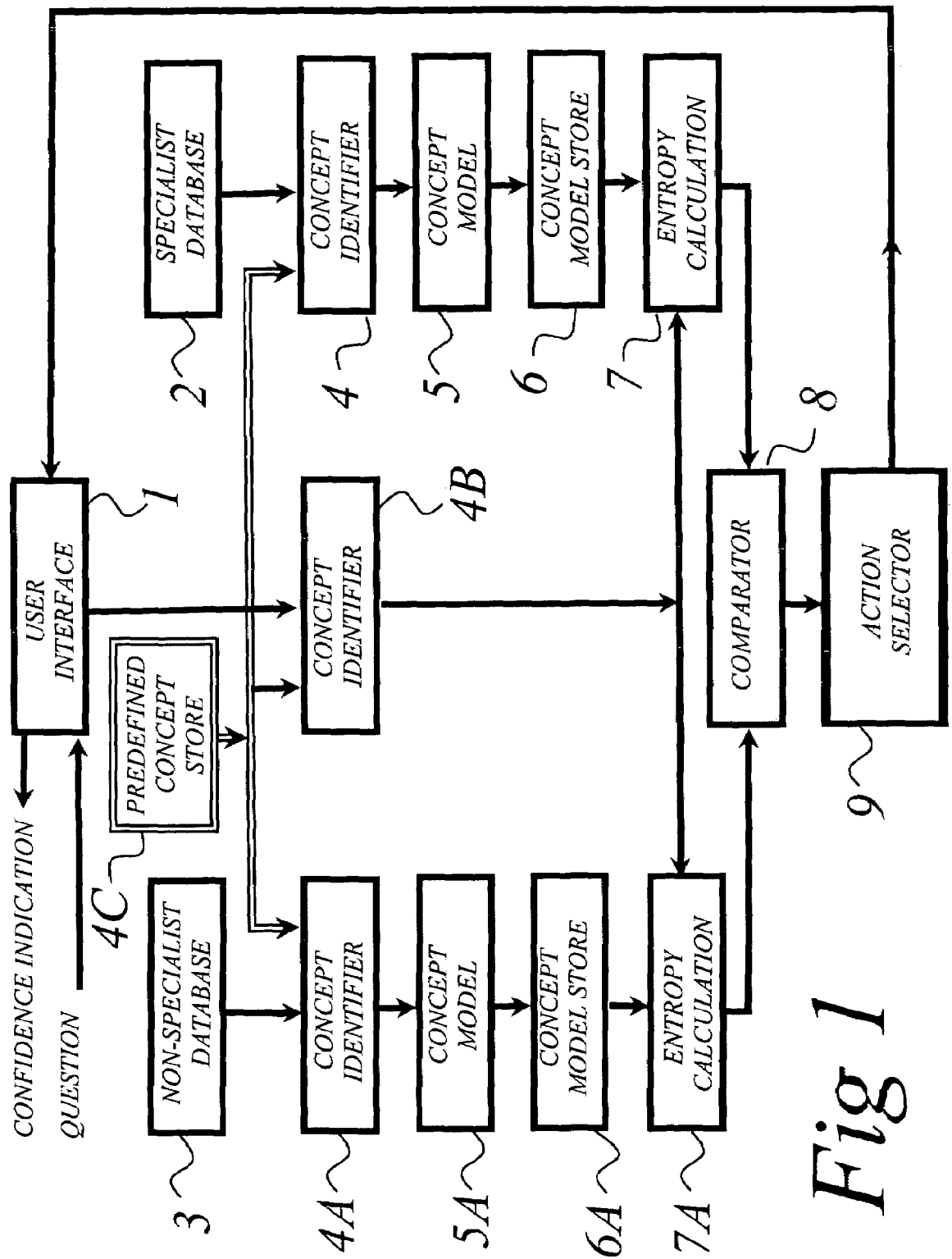
FIG. 1 illustrates, by way of example, an information handling system constructed in accordance with the invention and designed to answer questions about mortgages.

Referring firstly to FIG. 1 there is shown a system for answering questions about mortgages. The operation of this system will be described on the assumption, for the purposes of example, that a question entered by a user via a website enters at a user interface 1. The interface 1, in this example, is simply a data input to a computer system.

The computer system includes a database 2 containing, in different segments of its memory, answers to respective questions frequently asked about mortgages.

A second database 3, about 100,000 times larger than the database 2, contains information covering a broad spectrum of subjects, this information having been collected at random, in this example from the Internet. This database 3 does not necessarily have to be this large; a size of about 100 times that of database 2 might be adequate.

A concept identifier mechanism 4 contains a tokeniser and a stemmer constructed as described in J. B. Lovins, 1968: "Development of a stemming algorithm," Mechanical Translation and Computational Linguistics 11, 22-31. It is connected to a concept store 4C that contains a dictionary of a large number of concepts encoded in electronic form. A suitable dictionary is The Wordnet Lexical Database produced by the Cognitive Science Laboratory, Princeton University, USA.

The mechanism 4 is adapted to perform a mapping function on the tokenised or stemmed content of the database 2 so as to identify concepts in the specialist database. It can be constructed along principles as described in U.S. Pat. No. 5,937,422.

Block 5 of FIG. 1 counts the number of times each concept occurs in the database 2 and divides by the total number of concept occurrences over all concepts in the database 2. From this information it generates a distribution of concept frequencies which can be looked upon as a concept model for the specialised database. This concept model, which is generated on start-up of the whole system, is stored at block 6 of FIG. 1.

Also as part of the start-up operation, the content of the non-specialist database 3 is processed, in blocks 4A, 5A and 6A in exactly the same manner as for the content of the specialist database 2.

When an incoming query is presented at the input, this is subjected to concept identification at block 4B which is identical in operation to blocks 4 and 4A. The output of block 4A is the fed to an entropy calculator 7 which calculates the entropy of the identified concepts, from 4B, relative to the concept model 6. This can be done using principles set out by C. E. Shannon in *"A mathematical Theory of Communication" in The Bell System Technical Journal"* Vol. 27 pp 379-423 and 623-656, July and October 1948.

The output of block 4B is also fed to an entropy calculator 7A which is identical to block 7 and which calculates the entropy of the concepts identified in the incoming query, relative to the concept model stored at 7A. A comparator 8 compares the entropy values from blocks 7 and 7A to give an output that is indicative of the relative relevance of the question to the specialist database 2 as compared with its relevance to a random collection of data in the database 3.

The output of the comparator 8 is used to select one of three images stored at 9. The selected image is fed via the interface 1 to the user. The three images portray a person with appropriate demeanour and facial expression and accompanying text indicating to the user that 1) information from the database answers the query; 2) information from the database may answer the query; or 3) reliable information answering the query is not available and the user should look elsewhere.

FIG. 1 shows only the process by which these images of confidence levels are generated. It does not show the process by which the query from the user is used to extract information from the database 2; the latter process, being conventional.

Figure 2:
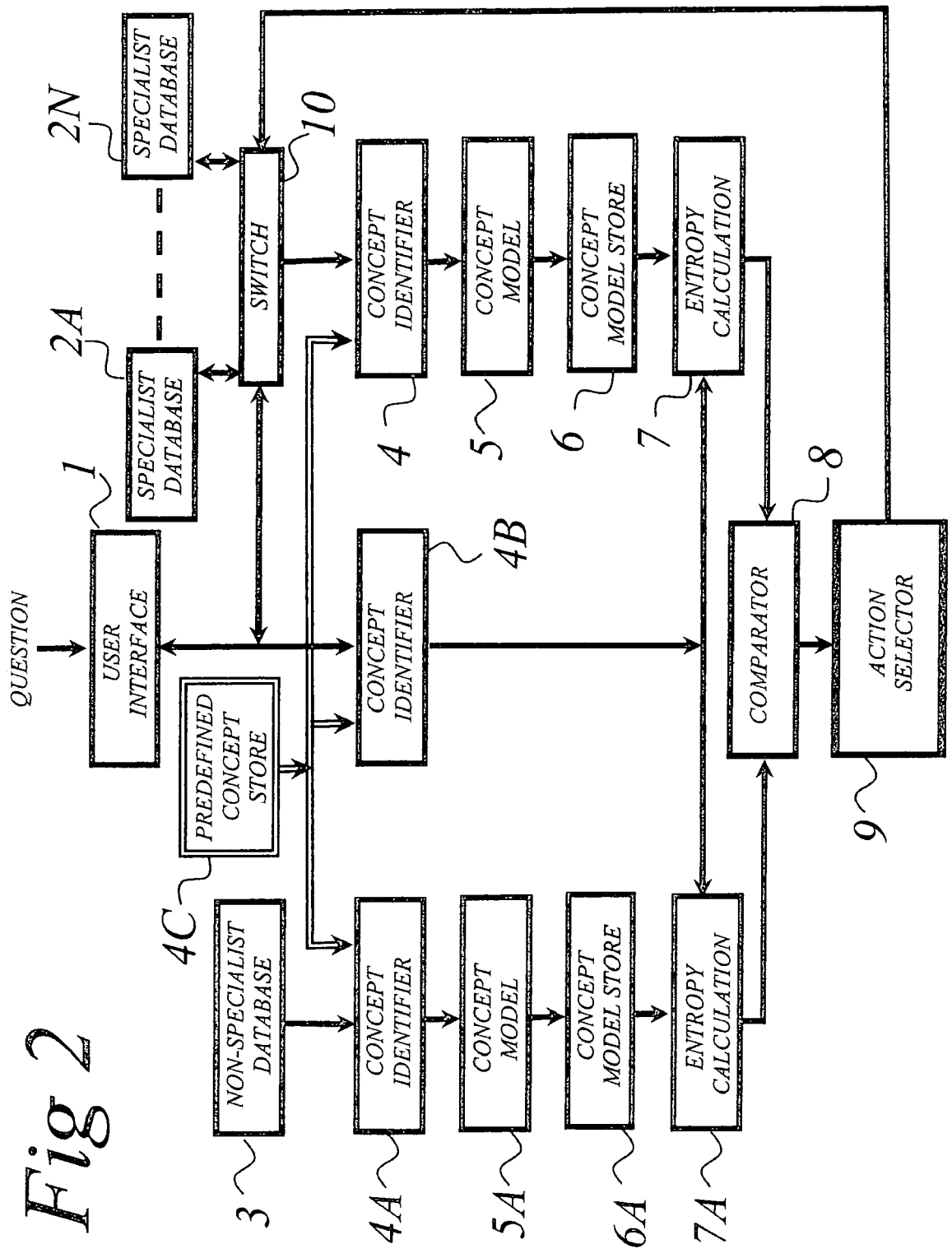
FIG. 2 illustrates a variation of the system of FIG. 1.

Referring now to FIG. 2 there is shown a variation in which components equivalent to those of FIG. 1 are denoted by identical reference numerals. In this embodiment a number of separate specialist databases 2A to 2N are included. If the action selector 9 indicates only a low level of confidence that the question is appropriate to the database from which the concept model stored at 6 was derived, it causes switch 10 to load the content of another database 2A to 2N into the concept identifier 4 until a database is found which results in a high confidence level. The switch 10 then routes the question to that database. In an alternative arrangement, all the databases could be tried in turn and then the switch 10 controlled so as to make the database giving the highest confidence value available to be addressed by the input question.

An arrangement like that shown in FIG. 2 can be used to control the application of advertisements to websites depending on the relevance of the advertisement to that website. In this arrangement, blocks 2A to 2N would represent particular websites, and the input at 1 would be an advertisement of possible relevance to those websites. The non-specialist database 3 could, in this embodiment of the invention, be the World Wide Web or a selected part of it. In operation, the relevance of the advertisement to each website is calculated in turn at 9 and used by the switch 10 to apply the advertisement to that website or not to do so.

Figure 3:
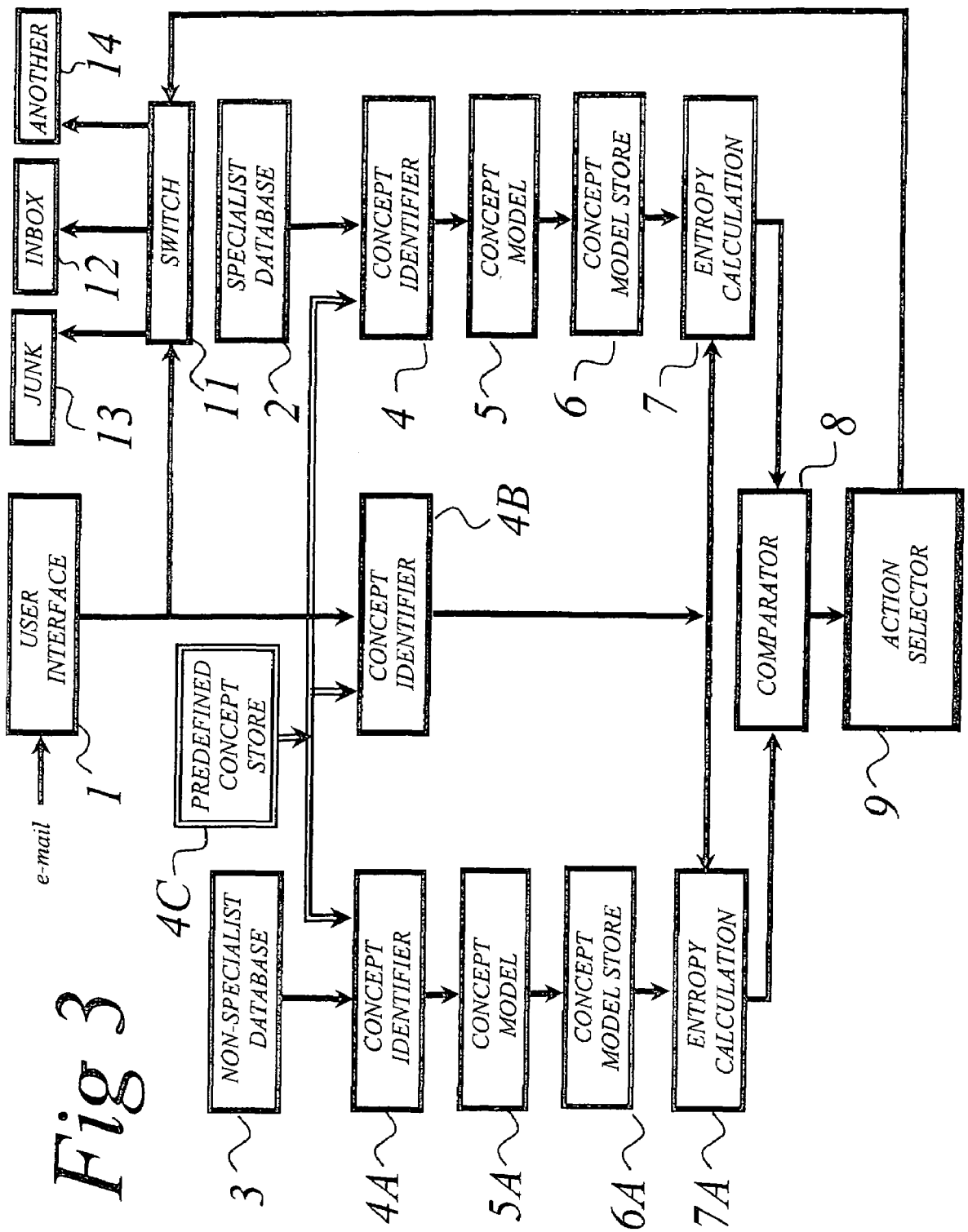
FIG. 3 illustrates an embodiment of the invention designed as an anti-spam filter for rejecting inappropriate electronic messages.

FIG. 3 shows an arrangement in which the invention is used as an email filtering system. In this system, an electronic message entering at 1 is passed by a switch 11 either to an inbox 12, a junk mailbox 13, or forwarded to another operator 14. This selection is performed by a system similar to that of FIG. 1 but where the specialist database 2 is a store of all previously received and sent emails or some other collection of data containing concepts relevant to the operator's business or personal activities.

Figure 4:
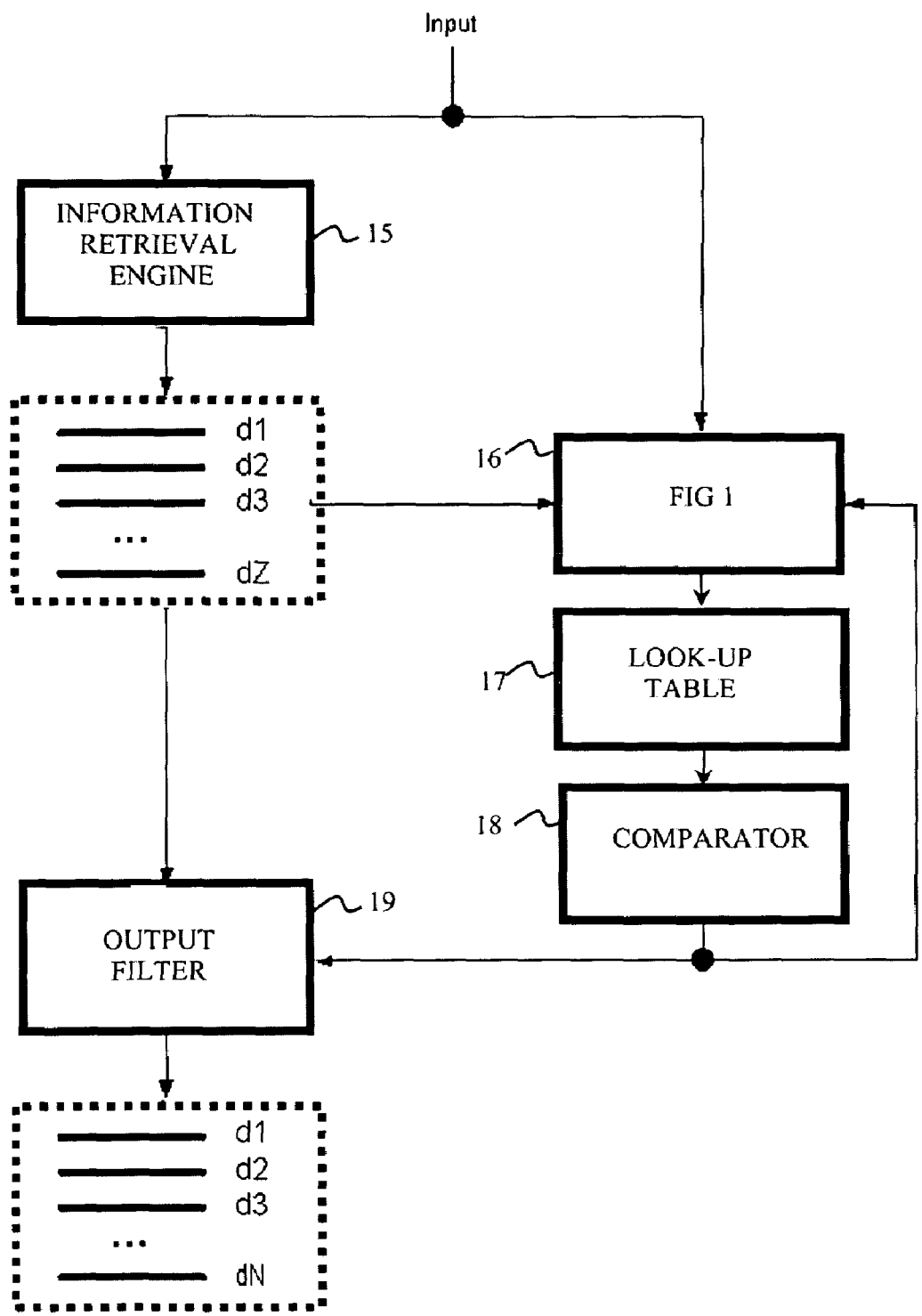
FIG. 4 illustrates an embodiment of the invention designed as an a device for selecting the optimum number of search results to be presented to the user of a search engine.

Referring now to FIG. 4, information retrieval engines often return a very large number of documents as output to a particular input. This is not optimal to a human operator since many of the documents may not be relevant to the input, but are returned merely because they contain matching words. The motivations for undertaking optimisation of search results are discussed in *"Context and Page Analysis for Improved Web Search"*, S. Lawrence and C. L. Giles, *IEEE Internet Computing*, Volume 2, Number 4, pp. 38-46, 1998.

The invention can be used to limit the results returned from an information retrieval engine to only those most relevant to the input as calculated by the invention. A system for doing this is illustrated schematically with reference to FIGS. 4 and 5.

In this embodiment, an input is applied to both an information retrieval engine 15 and to a block 16 that is essentially similar to the structure of FIG. 1. The output of the information retrieval engine 15 is a list of documents, d1, d2, d3 . . . dz, ranked according to algorithms employed by the information retrieval engine. Z is an integer representing the total number of documents returned by the information retrieval engine. These documents are supplied to the "specialist database" 2 within a system like that of FIG. 2. and are fed by the switch 10 into a series of specialised database collections, 2A, 2B, 2C . . . 2N, where $$2A = d1$$

$$2B = d1 + d2$$

$$2C = d1 + d2 + d3$$

. . .

$$2N = d1 + d2 + d3 \ldots + dN,$$

N is an integer less than or equal to Z.

The block 16 calculates a series of confidence factors, cf1, cf2, cf3 . . . cfN, one for each database collection and these are stored in a look-up table 17, sequentially, as each is calculated beginning with (2A, cf1). A comparator 18 calculates N by assessing whether each confidence factor is either: a new peak, cfMax, or a lower threshold of confidence factor, cfN, that is proportional to cfMax (e.g. 10% of cfMax). When cfN is reached, the comparator signals the invention to stop supplying confidence factors, and outputs N to an output filter 19. FIG. 5 shows a plot of a typical sequence of confidence factors, which will help visualize the process.

The output of the information retrieval engine 15 is stored in the output filter 19. When the filter 19 is supplied with a number N from comparator 18, it provides the final output, d1, d2, d3 . . . dN where N is the number of documents which, as a collection, give the highest confidence factor measurement.

It will be appreciated that the illustrated examples have been given only by way of example and that the operation has been simplified to assist understanding. There are many aspects which could be modified in these examples. For example some of the identical operations performed in different physical blocks shown in the drawings could be performed in a time-multiplexed fashion by a single physical facility (which will normally be an area of programmed computer memory.) It will also be appreciated that in many situations it will only be necessary to derive the concept models occasionally, when there is a change in the specialist database, or when it is desired to update the non-specialist database. The latter may need to be updated only very occasionally and therefore the elements 3, 4A and 5A may not need to be included in a practical embodiment of the invention, provided those components have previously been employed to derive an appropriate concept model to be stored at 6A.

It will be noted that all the described embodiments include a facility to derive an indication of the relevance of a specialist database to an item of input data as a function of the relevance of a less specialist store of information; and by employing this technique it is believed that it becomes possible to significantly improve many processes in computer handling of data.

The invention claimed is:

1. An information handling mechanism to determine if an information source is applicable to a given information need comprising
    a) an interface connected to a communication channel for receiving a communication from a user;
    b) a specialist database containing information relevant to a specialist subject;
    c) means for identifying concepts in the user communication;
    d) means for generating concept models indicating occurrences of concepts in the specialist database and in a less specialist database;
    e) means for calculating relative probability, responsive to the means for generating concept models and the means for identifying concepts in the user communication, that the identified concepts could have been generated by each concept model and to provide an output indicative of the relevance of the specialist database to the communication; and
    f) an action selector for generating a signal, responsive to the output of the means for calculating relative probability, arranged either to give a user an indication of the relevance of the specialist database or to automatically redirect the communication in a way dependent on such relevance.

2. An information handling mechanism according to claim 1, wherein a plurality of different specialist databases are provided, means are provided for preselecting one of the plurality of databases as the operative database, said action selector, responsive to low relevance of the preselected database as determined from the means to calculate relative probability automatically redirects the communication to a second preselected database to determine its relevance.

3. An information handling mechanism according to claim 2, wherein the mechanism includes switch means controlled by the action selector for automatically serially checking the plurality of databases until a database is determined with an effective relevance to the communication.

4. An information handling mechanism according to claim 1, wherein the communication to the interface is an email, and the action selector controls a switch to direct the communication to a user's inbox, to junk mail or to another dependent on relevance determined.

5. An information handling mechanism according to claim 2, wherein the plurality of databases are constituted from web pages generated by an information retrieval engine responsive to a communication input from a user, means for processing the web pages to determine their relevance with respect to the communication and to assign a value of relevance, an output filter receiving the web pages with their assigned relevance values, and means for outputting to the user the web pages having assigned values greater than a predetermined value.

6. An information handling mechanism according to claim 1 in which the concept model includes a frequency distribution.

7. An information handling mechanism according to claim 1 in which the concept model includes information about the relationship between concepts in a passage of information.

8. An information handling mechanism according to claim 1 in which the concept model includes information about the adjacency of concepts.

9. An information handling mechanism according to claim 1 including means for using the output of the means for calculating relative probability to give a user an indication of confidence in the ability of the specialist database to answer a question applied to the input.

10. An information handling mechanism according to claim 1 in which the specialist database has divisions and switch means are provided, acting responsive to the action selector signal to perform a switching operation between divisions.

11. An information handling mechanism according to claim 10 further comprising means for applying the input communication as a query to any information retrieval engine to produce a number of answers in order of relevance; means for feeding those answers into the specialist database incrementally so as to give a series of outputs from the means for calculating relative probability for different combinations of answers loaded into the specialist database; and means for selecting a combination which gives the optimum output value from the means for calculating relative probability.

12. An information handling mechanism according to claim 11 in which:

the "specialist database" is a selected website, the input is an advertisement or text describing it;

and including means for using the output of the means for calculating relative probability to control the application of the advertisement to the selected website.

13. An information handling mechanism according to claim 1 in which the "less specialist database" is the World Wide Web or a part of it.

* * * * *